United States Patent [19]

Kollar et al.

[11] Patent Number: 5,505,920

[45] Date of Patent: Apr. 9, 1996

[54] PROCESS FOR TREATMENT OF WASTE GAS FROM A CYCLOHEXANE OXIDATION REACTOR

[75] Inventors: John Kollar, Wyckoff, N.J.; Götz-Gerald Börger, Odenthal; Matthias Stenger, Monheim, both of Germany

[73] Assignees: Bayer Aktiengesellschaft, Leverkusen, Germany; Redox Technologies, Inc., Wyckoff, N.J.

[21] Appl. No.: 318,010

[22] Filed: Oct. 4, 1994

[51] Int. Cl.$^6$ .............................. C01B 31/20; C10K 1/10
[52] U.S. Cl. .................. 423/246; 423/245.1; 423/245.2; 423/245.3; 562/590; 562/600
[58] Field of Search ..................... 562/590, 600; 423/210, 245.1, 245.2, 245.3, 246; 95/230, 237

[56] References Cited

U.S. PATENT DOCUMENTS

| | | | |
|---|---|---|---|
| 4,032,569 | 6/1977 | Onopchenko et al. | 260/553 |
| 4,102,983 | 7/1978 | Yamase et al. | 423/245 |
| 4,263,453 | 4/1981 | Schulz et al. | 562/543 |
| 5,321,157 | 6/1994 | Kollar | 562/543 |

FOREIGN PATENT DOCUMENTS

94/07834  4/1994  WIPO.

*Primary Examiner*—Michael Lewis
*Assistant Examiner*—Amy Marie Harding
*Attorney, Agent, or Firm*—Joseph C. Gil; Richard E. L. Henderson

[57] ABSTRACT

The present invention relates to a process for the treatment of waste gas discharged from a cyclohexane oxidation reactor used in the manufacture of adipic acid, said waste gas containing mainly nitrogen, oxygen, carbon monoxide, carbon dioxide, acetic acid, and up to 10% by weight cyclohexane, as well as other gases or vapors, by (a) scrubbing the waste gas from the cyclohexane oxidation reactor with acetic acid in a first absorption step to reduce the amount of cyclohexane to a residual content of less than about 1% by weight, (b) scrubbing the waste gas from the first absorption step with water in a second absorption step to reduce the amount of acetic acid to a residual content of less than about 1% by weight, and (c) subjecting the scrubbed waste gas from the second absorption step to an oxidation step to oxidize carbon monoxide and other oxidizable components of the waste gas to carbon dioxide and water.

4 Claims, 1 Drawing Sheet

PROCESS FOR TREATMENT OF WASTE GAS FROM A CYCLOHEXANE OXIDATION REACTOR

BACKGROUND OF THE INVENTION

This invention relates to a process for the treatment of waste gas discharged from a cyclohexane oxidation reactor for the manufacture of adipic acid that allows the recovery of valuable materials contained in the waste gas.

During the one-step oxidation of cyclohexane to adipic acid (for example, based on the processes disclosed in U.S. Pat. No. 5,321,157 and international patent application WO 94/07834), gaseous, supercritical, and thus non-condensable components are discharged from the reactor. It is necessary to deal on one hand with the gaseous reaction products carbon monoxide (CO) and carbon dioxide ($CO_2$), as well as on the other hand with the feed materials $O_2$ (added in small excess amounts) and nitrogen gas $N_2$ (which is included when, preferably, air or oxygen-enriched air is used as the oxidation agent). Nitrogen normally forms the main component of the waste gas (80 to 90% by weight during oxidations with air). Together with these supercritical, inert components, other materials corresponding to the thermodynamic equivalent weight composition —for example, the cyclohexane feed material, the acetic acid solvent, the intermediate product cyclohexanone, and the water produced as a reaction product —are discharged in the vapor phase. These other materials can be only partially separated by condensation, with the solidification point of the acetic acid (about 15°C.) acting as a primary limiting factor. The waste gas therefore still contains a high percentage of valuable products, especially cyclohexane and acetic acid, which should be recovered as completely as possible for cost and environmental reasons. This is especially important when using small cyclohexane throughputs. In addition, the waste gas must be cleaned of carbon monoxide prior to discharge into the atmosphere.

The inventive process described below provides the solution to this task, and has the following main advantages:

(i) the materials used as the absorption solution are materials already present in the system, which means that no contamination of the process by foreign material can occur during the recovery of the valuable materials cyclohexane and acetic acid, (ii) the absorption liquids can be made available in required quantities from the process itself, without significant additional preparation costs, and the absorbates can be recycled to the process at appropriate points, such that no additional expenditures occur for the preparation of the materials required and the removal of residual materials.

SUMMARY OF THE INVENTION

The present invention relates to a process for the treatment of waste gas discharged from a cyclohexane oxidation reactor used in the manufacture of adipic acid, said waste gas containing mainly nitrogen, oxygen, carbon monoxide, carbon dioxide, acetic acid, and up to 10% by weight cyclohexane, as well as other gases or vapors, comprising (a) scrubbing the waste gas from the cyclohexane oxidation reactor with acetic acid in a first absorption step (optionally after cooling the waste gas to reduce the amount of condensable vapors) to reduce the amount of cyclohexane to a residual content of less than about 1% by weight, (b) scrubbing the waste gas discharged from the first absorption step with water in a second absorption step to reduce the amount of acetic acid to a residual content of less than about 1% by weight, and (c) subjecting the waste gas discharged from the second absorption step to an oxidation step to oxidize carbon monoxide and other oxidizable components of the waste gas to carbon dioxide and water.

DETAILED DESCRIPTION OF THE INVENTION

Figure 1:
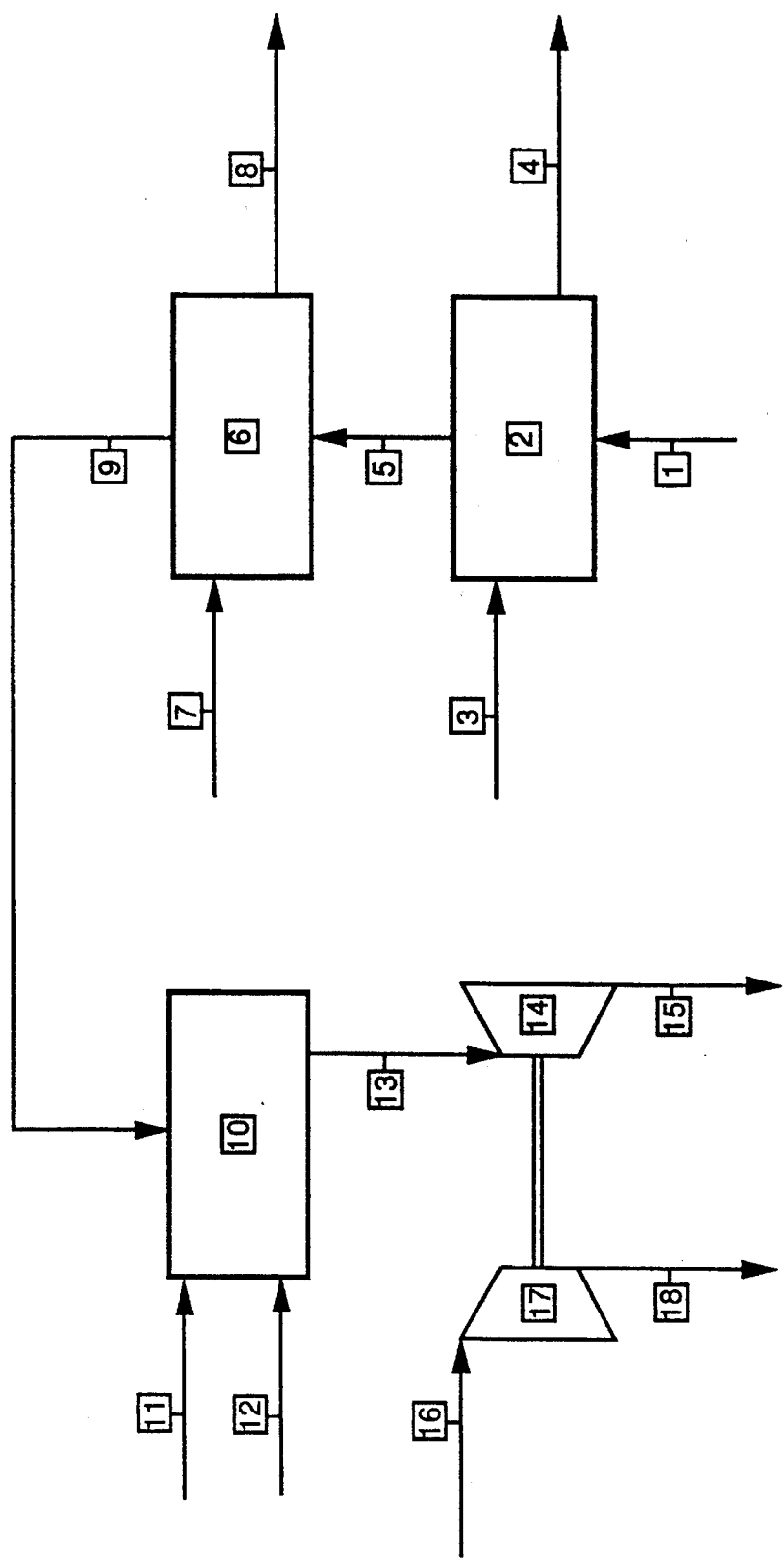
FIG. 1 is a schematic representation of a preferred embodiment of the process of the invention and of an optional means for using waste gases to drive a compressor used to introduce oxidizing gas into the cyclohexane oxidation reactor.

The process of the invention is especially well suited for the treatment of waste gases that arise during the one-step oxidation of cyclohexane to adipic acid using acetic acid as a solvent. Such processes are, for example, described in U.S. Pat. No. 5,321,157 and international patent application WO 94/07834, as well as in the publications mentioned in these patent applications.

The waste gas to be treated according to the invention preferably contains mainly nitrogen (typically 80 to 90% by weight) and contains other gaseous or vaporized components such as carbon monoxide, carbon dioxide, oxygen, and acetic acid, as well as traces of other gases or vapors, in addition to about 1 to about 10% by weight (preferably 1 to 5% by weight) of cyclohexane.

If the cyclohexane content of the waste gas discharged from the oxidation reactor is above about 5% by weight, the quantity of vaporized, condensable components, especially the cyclohexane, should preferably be reduced prior to scrubbing with acetic acid. This reduction of condensable components can be achieved by cooling the waste gas, preferably to temperatures of about 15° C., such that the waste gas to be subjected to acetic acid scrubbing exhibits a cyclohexane content within the above-mentioned range.

When carrying out the process of the invention, an arrangement similar to the one schematically illustrated in FIG. 1 is well suited. The components and steps in FIG. 1 are defined as follows:

(1) represents the waste gas stream to be treated according to the invention (optionally after prior cooling to remove condensable components) in absorption step (2), preferably introduced at the sump side;

(2) represents the cyclohexane absorption step;

(3) represents the acetic acid stream which is applied in absorption step (2), preferably at the top of the column;

(4) represents the mixture of cyclohexane and acetic acid that is discharged from absorption step (2) and which can be further oxidized in the cyclohexane oxidation reactor;

(5) represents the waste gas stream discharged from absorption step (2) and supplied to the acetic acid absorption step (6), preferably at the sump side;

(6) represents the acetic acid absorption step;

(7) represents the extraction water stream used in absorption step (6), preferably introduced at the top of a column;

(8) represents the aqueous acetic acid discharged from absorption step (6);

(9) represents the waste gas supplied to the oxidation step (10);

(10) represents the oxidation step;

(11) represents the oxidation agent (preferably air) used for oxidation step (10);

(12) represents an energy source (for example, natural gas) used to initiate and sustain oxidation of waste gas (9) in step (10);

(13) represents the waste gas discharged from oxidation step (10);

(14) represents a turbine powered by waste gas (13);

(15) represents the waste gas discharged from turbine (14);

(16) represents the gaseous oxidation agent (preferably air and/or oxygen) to be supplied to compressor (17) for introduction into the cyclohexane oxidation reactor;

(17) represents a compressor, and

(18) represents the oxidation agent leaving compressor (17).

Absorption steps (2) and (6) can consist, for example, of the usual packed or trayed columns and are carried out at a pressure of about 1 to about 100 bar (preferably 2 to 50 bar and more preferably 4 to 15 bar) and in a temperature range of about 0)20 to about 100° C. (preferably 2 to 50° C. and more preferably 15° to 45° C.).

Acetic acid absorbent (3) for use in step (2) generally consists of technical grade acetic acid with a purity of at least 99% by weight, although lower purity acetic acid can be used if the remaining components in the acetic acid do not significantly inhibit the solubility of the cyclohexane.

Aqueous absorbent (7) for use in step (6) can be pure water, but it is also possible to use dilute aqueous acetic acid having an acetic add content of up to 10% by weight (which would have as an advantage low preparation costs) or even wash water from the stripper used to isolate adipic acid from the cyclohexane oxidation reactor containing succinic, glutaric, or adipic acid, as well as other high boiling components, in amounts that do not lower the absorption of acetic acid in step (6).

The flow rates of streams (1) and (5) are generally selected to provide a weight ratio of acetic acid in stream (3) to the amount of cyclohexane in stream (1) of at least about 5:1 (preferably at least 7:1 and more preferably 12:1 up to 20:1). The flow rates of streams (5) and (7) are generally selected to provide a weight ratio of water in stream (7) to acetic acid in stream (5) of at least about 0.25:1 (preferably at least 1:1 and more preferably 2.5:1 up to 5:1).

Stream (4), which contains mainly a mixture of acetic acid and cyclohexane, can be directly returned to the cyclohexane oxidation reactor process for further oxidation. Stream (5) contains less than about 1% by weight, and generally only 0.01 to 0.1% by weight, cyclohexane. Stream (8), which represents the aqueous acetic acid discharged from separation step (6), can be separated into its components, for example, by distillation. Stream (9) contains less than 1% by weight, and generally only 0.01 to 0.1% by weight, acetic acid.

Stream (9) contains carbon monoxide, oxygen, as well as residues of cyclohexane, cyclohexanone, and acetic acid, in addition to nitrogen and carbon dioxide. The poisonous carbon monoxide can be oxidized in a catalytic or oxidation reactor (10) with oxygen from air (11) to form carbon dioxide. At the same time, the organic residues of cyclohexane, cyclohexanone, and acetic acid are oxidized to form carbon dioxide and water. The heat of reaction released in step (10) can be used to maintain the reaction autothermally if an appropriate heat exchanger is included. The operating temperature of step (10) is between about 280° C. and about 600° C., depending on the catalyst selected, which means that the waste gas must be preheated before oxidation takes place. The start-up temperature in the catalyst bed can be attained by firing with natural gas (12) at standard pressure prior to beginning the oxidizer operation. Under steady-state operation, the temperature of the catalyst can be controlled controlling the addition of acetic add in absorption step (2), by which the residual cyclohexane in the waste gas can be adjusted. Alternatively, and preferably, supplemental firing with natural gas can be provided, preferably by addition of natural gas to the gas stream. Finally, exclusive firing with natural gas can be used. Firing with natural gas allows the maximum technically achievable quantity of cyclohexane to be recovered in the absorption step rather than be consumed to maintain oxidation step (10).

The energy in the waste gas (13), which is discharged from oxidation step (10) at a pressure of 2 to 50 bar (preferably 4 to 15 bar) and at a temperature between 50 to 500° C., can be recovered with a turbine (14). Consequently, part of the drive power for air/oxygen compressor (17) can be provided by the reaction component of the overall process.

The following example further illustrates details for the process of this invention. The invention, which is set forth in the foregoing disclosure, is not to be limited either in spirit or scope by this example. Those skilled in the art will readily understand that known variations of the conditions of the following procedure can be used. Unless otherwise noted, all temperatures are degrees Celsius and all percentages are percentages by weight.

EXAMPLE

The following Example illustrates the treatment of waste gas discharged from a cyclohexane oxidation reactor, with reference to the labels of FIG. 1.

The manufacture of 8000 kg/hr adipic acid by a one-step cobalt-catalyzed oxidation of cyclohexane with 8 mole percent throughput using air as the oxidation agent resulted in a waste gas flowrate of 32.7 metric tons per hour having the following composition: 88.6% nitrogen; 3.5% oxygen 3.6% cydohexane; 3.3% carbon dioxide; 0.6% acetic add, 0.23% carbon monoxide; 0.14% water; and 0.03% cyclohexanone.

Cyclohexane absorption step (2) was carried out at a pressure of 7 bar and a temperature of 30° C. using a column having an inside diameter of 1.6m and packed with ceramic highflow rings DN 50 (packing height 5 m). Acetic acid with a purity of 99.5% was used as absorbent (3) at a flowrate of 16.5 metric tons per hour, which corresponded to a weight ratio of acetic acid to cyclohexane of 15:1. The cyclohexane content in the waste gas (5) was reduced in this way to less than 1% by weight.

Acetic acid absorption step (6) was carried out at a pressure of 7 bar at a temperature of 25° C. using a trayed column having 16 trays. Aqueous extraction stream (7) contained a mixture of 63% by weight water, 6% by weight acetic acid, and 31% by weight of high-boiling water-soluble organic compounds (especially adipic acid, succinic acid, and glutaric acid), which, however, did not hinder the absorption process. The weight ratio of water in stream (7) to acetic acid in stream (5) was 3:1.

The acetic acid content of waste gas stream (9) leaving the absorption step was less than 1% by weight. Waste gas stream (9) was fed to the oxidation step (10).

What is claimed is:

1. A process for treatment of waste gas discharged from a cyclohexane oxidation reactor from oxidizing cyclohexane to adipic acid said waste gas containing mainly nitrogen, oxygen, carbon monoxide, carbon dioxide, acetic acid, and up to 10% by weight cyclohexane, as well as other gases or vapors, comprising (a) scrubbing the waste gas from the cyclohexane oxidation reactor with acetic acid in a first absorption step to reduce the amount of cyclohexane to a residual content of less than 1% by weight, (b) scrubbing the waste gas discharged from the first absorption step with water in a second absorption step to reduce the amount of acetic acid to a residual content of less than 1% by weight, and (c) subjecting the waste gas discharged from the second absorption step to an oxidation step to oxidize carbon monoxide and other oxidizable components of the waste gas to carbon dioxide and water.

2. A process according to claim 1 wherein the first absorption step (a) is carried out after the waste gas is cooled to reduce the amount of condensable vapors.

3. A process according to claim 2 wherein the waste gas is cooled to about 15° C.

4. A process according to Claim 1 additionally comprising (d) passing the waste gas stream discharged from oxidation step (c) at a pressure of 2 to 50 bar through a turbine to supply part of the drive power for a compressor used to introduce a gaseous oxidation agent into the cyclohexane oxidation reactor.

* * * * *